Dec. 31, 1968 R. N. BRANDON 3,419,201
DISPENSER AND CUTTER AND THE LIKE
Filed April 18, 1966 Sheet 9 of 11

United States Patent Office 3,419,201
Patented Dec. 31, 1968

3,419,201
DISPENSER AND CUTTER AND THE LIKE
Richard N. Brandon, 183 Homewood Ave. SE.,
Warren, Ohio 44483
Filed Apr. 18, 1966, Ser. No. 543,099
4 Claims. (Cl. 225—93)

ABSTRACT OF THE DISCLOSURE

A household wrap dispenser which cuts the wrapping material by movement of an outer wall of the dispenser. Cooperating clamping surfaces on the movable outer wall and an inner wall clamp the wrapping material on opposite sides of a fixed cutter and then move the material relative to the fixed cutter to cause the material to be severed.

This invention relates to a dispenser and cutter and the like and particularly to a dispenser and cutter for household wrap having a means whereby the material to be cut is first clamped on both sides of a cutting blade followed by a movement of the cutter blade in between the two clamped areas to cut the material.

It is an object of the invention to provide an improved household wrap dispenser and cutter which is operated in a simple manner to dispense and cut household wrap more effectively than the devices presently available to the consumer.

The foregoing and other objects, features, and advantages of the invention will be apparent from the following more particular description of three preferred embodiments of the invention, as illustrated in the accompanying drawings, forming a part of the application and wherein like reference numerals indicate like parts.

In the drawings:

FIGURE 12 is a perspective view of another embodiment of the dispensing container of this invention as utilized in a horizontal position on a counter top or the like.

FIGURE 13 is a perspective view of the container of FIGURE 12 and illustrates the use of the container of FIGURE 12 mounted to a vertical wall or the like.

FIGURE 28 is a fragmentary view similar to FIGURE 14 and illustrates another embodiment of this invention.

FIGURE 29 is a view similar to FIGURE 28 and illustrates still another embodiment of this invention.

It is to be understood that throughout this application the term "sheet" is used in the broad sense as encompassing such terms as "film," "ribbon," "foil," "tape," and other such thin materials. Also, it is to be understood that the term "cutting" is used in the broad sense to include not only a complete severing along a line but a series of perforations as well.

Figure 1:
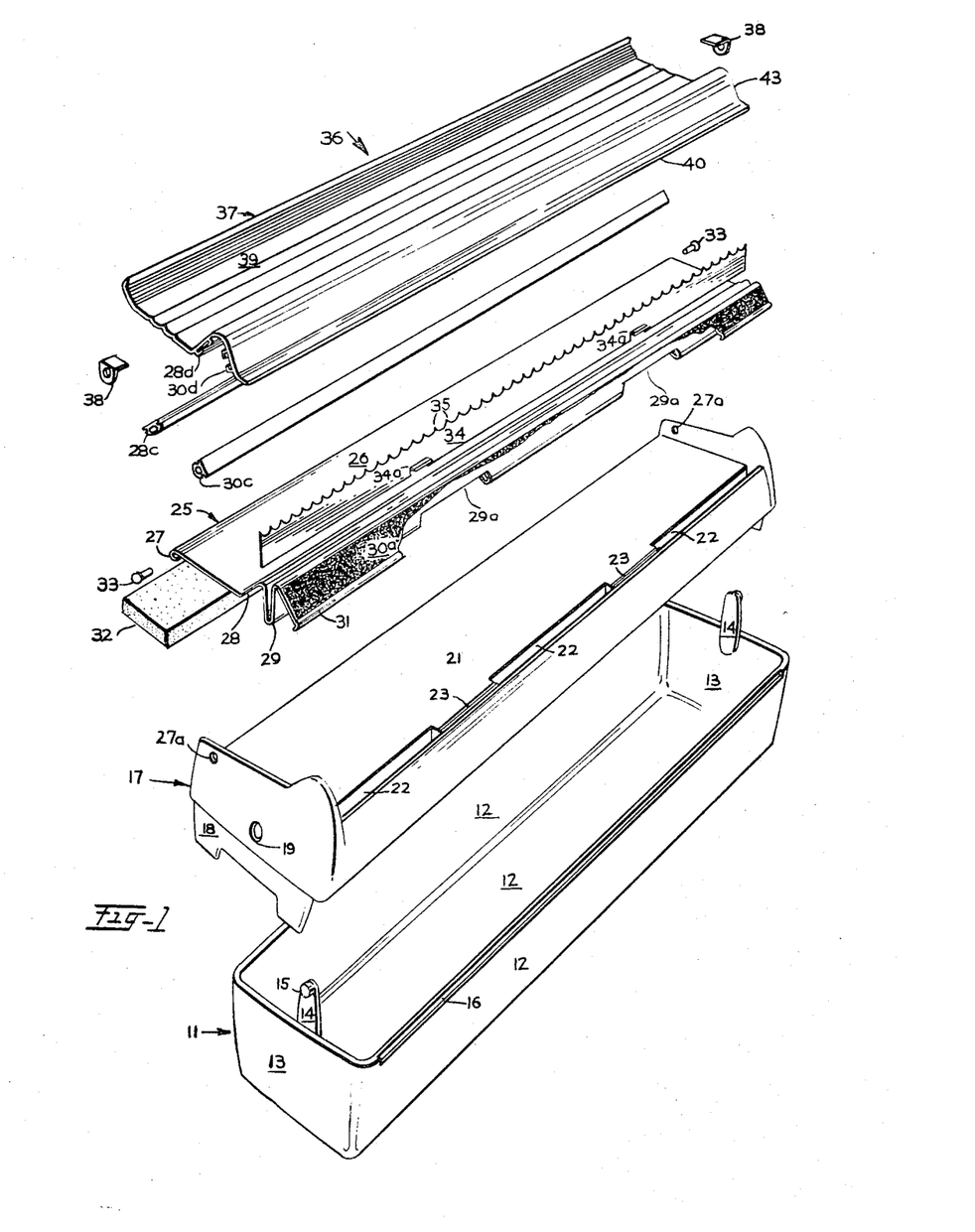
FIGURE 1 is an exploded view of one embodiment.
Figure 2:
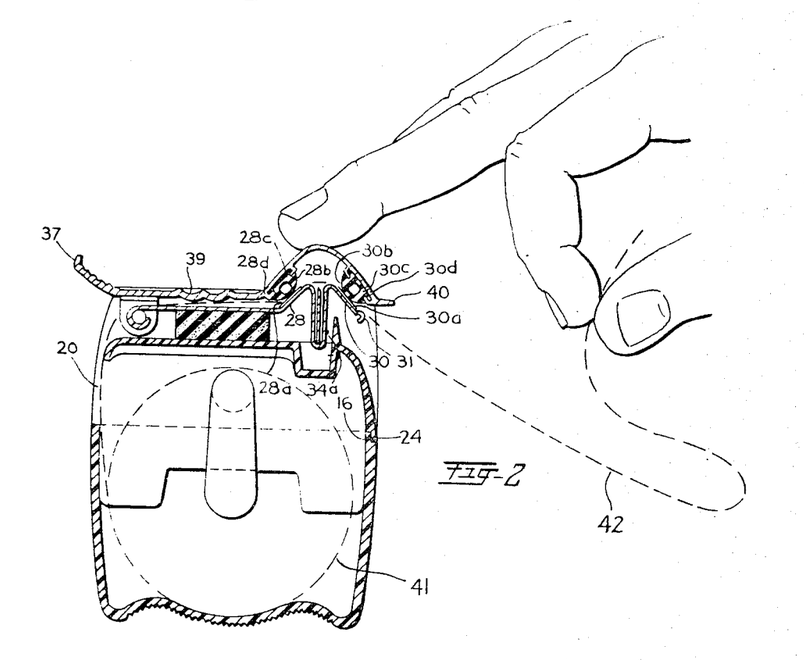
FIGURE 2 is a cross-sectional view of assembled FIGURE 1 looking in an axial direction and showing the position of the parts just prior to actuation of the cutter.

With reference to FIGURES 1 and 2, a first embodiment of a combination dispenser and cutter is shown, which is especially adapted for the dispensing of household aluminum foil wrap. The roll of foil is housed in a container 11 having three side walls 12, two ends 13, two cantilevered projecting arms 14, having locking buttons 15 on the end thereof. Around the top periphery is a container-mating edge 16 adapted to mate with the cover 17.

The cover 17 has two alignment legs 18 and two locking apertures 19. The cover 17 is held onto the container 11 by the cantilevered projecting arms 14 being pressed inward to permit alignment legs 18 to be internally received into the container 11 until mating edge 24 on the cover 17 mates with the container-mating edge 16. At this position the projecting arms 14 are permitted to swing out pushing locking buttons 15 into their respective locking apertures 19. When it is desired to separate the cover 17 from the container 11, the locking buttons 15 are pressed inwardly until they clear the inner wall of the container 11, at which position the cover can be removed.

Cover 17 also contains a wrap dispensing slot 20, a supporting surface 21, and three wells 22 which are separated by two blade supports 23. Also contained on cover 17 are two cover pivot points 27a.

The two rivets 33 extend through cover pivot points 27a, pivot bearings 38, and into pivot points 27 located on inner clamp 25 where they are held by frictional forces.

Inner clamp 25 contains a flat surface 26 and a first clamp area 28. Clamp area 28 is on a slight incline and is separated from clamp area 30 by a blade receiving channel 29 having contained therein two slots 29a. Mounted on clamp area 28 is a clamping surface 28a, which may be a roughened surface, an abrasive strip, or a layer of abrasive paint. A similar clamping surface 30a is located on clamp area 30. The outer terminus of inner clamp 25 is an edge flange 31 having a bead to smooth the exit of the foil wrap. On the under side of flat surface 26 is adhesively fastened a strip of vinyl open-celled resilient foam which is likewise adhesively fastened to supporting surface 21 of cover 17.

The blade 34, having scalloped teeth 35, is held in blade receiving channel 29 by means of tabs 34a projecting through slots 29a.

An outer clamp 36 is affixed to the pivot bearings 38 by welding, or otherwise, and has an outer cover 39, a lifting projection 40, an opening lever 37 and a hump 43. On the inside of the hump 43 a resilient strip support 28d and has a clamping surface 28b adapted to resiliently mate with clamping surface 28a. Likewise, resilient strip 30c is held by resilient strip support 30d so that its clamping surface 30b will resiliently mate with clamping surface 30a. The resilient strip support 28d and 30d are cut from pieces of extruded soft and flexible vinyl weather stripping.

Figure 3:
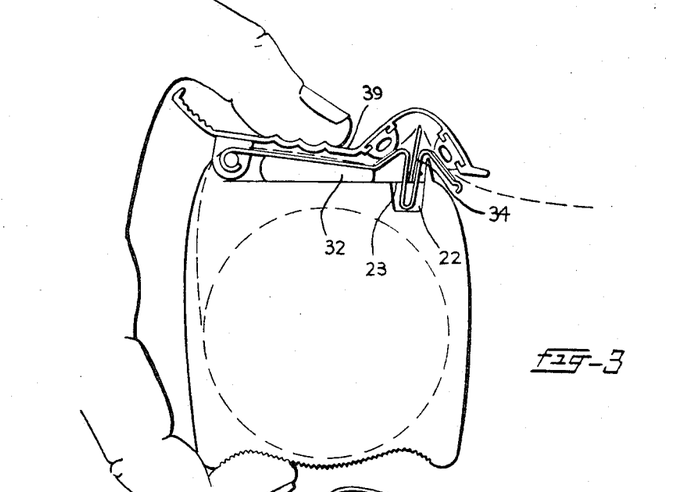
FIGURE 3 is a schematic view similar to FIGURE 2 but showing the position of the parts just after the sheet has been cut.
Figure 4:
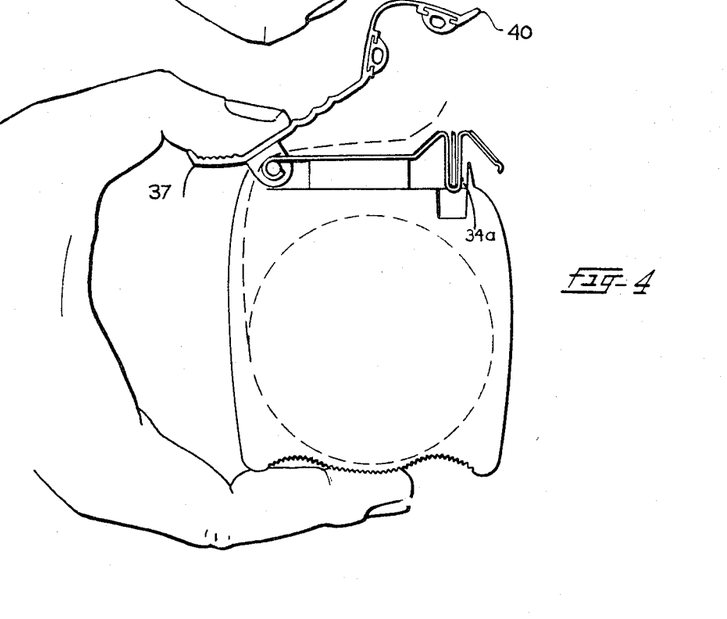
FIGURE 4 is a view similar to FIGURE 3 but showing the parts with the outer cover lifted to expose the end of the sheet prior to withdrawal of another piece.

The operation of the embodiment shown in FIGURES 1 through 4 is quite simple. After a roll 41 of household aluminum foil has been placed into the container 11, an end 42 is unrolled from the roll and threaded through wrap dispensing slot 20 of the cover 17 as it is removably attached in the manner described above to the container 11. The foil end 42 is then fed between the inner clamp 25 and the outer clamp 36. When it is desired to have a piece of foil, outer clamp 36 is opened by depressing the opening lever 27 as shown in FIGURE 4 or else by lifting the lifting projection 40. This causes the outer clamp to pivot about pivot bearing 38 to expose the foil. An end is grasped and the desired amount pulled from the roll. The outer clamp, which is permitted to close, comes to rest as shown in FIGURE 2 so that the foil is grasped on one side of the blade 34 between mating clamping surfaces 28b and 28a. Likewise, on the opposite side of the blade, the foil is grasped between mating clamping surfaces 30a and 30b. The outer clamp may be depressed either by pushing downward on hump 43 as shown in FIGURE 2 or by pushing downward on outer cover 39 portion. As the outer clamp 36 continues to be forced, the mating clamping surfaces clamp the foil tightly with the assistance of the resilient backing clamping surfaces 28b and 30b being provided by resilient strips 28c and 30c, respectively. Resistance to the cutting movement is offered by a spring which is preferably a resilient open-celled vinyl foam. As the cutting action is continued, the inner clamp 25 compresses resilient foam 32 and causes the blade receiving channel 29 to be depressed into wells 22 of the cover 17. The blade 34 which is loosely held in the blade receiving channel 29 by tabs 34a projecting into slots 29a is prevented from following the blade receiving channel 29 into wells 22 by blade supports 23. Slots 29a are the height sufficient to permit the blade receiving channel 29 to move downward with the blade but at the same time prevent the blade from falling out of the blade receiving channel.

With reference to FIGURE 3, as the cutting action is continued, the foil which is clamped on both sides of the blade is stretched over the blade and then forced downward so as to cause the teeth of the blade to first cut the foil in a series of perforations followed by a complete severing. Upon release of the cutting force, the resilient foam 32 expands to its normal position which causes the blade receiving channel 29 to return over blade 34 to form a guard for same. Since the force has been removed, the clamping forces are then practically nil and the foil end 42 which has just been severed falls freely from the dispenser.

It is to be noted that the dispenser and cutter can be easily actuated with one hand while the other hand may be busy holding an object to be wrapped. Also, it is to be noted that the dispenser and cover can be placed on a counter top in the position shown in FIGURES 2, 3 and 4, or it may be rotated 90 degrees so that the outer clamp is in a normal vertical position and can be mounted to the wall in any conventional manner.

Figures 5, 6, 7:
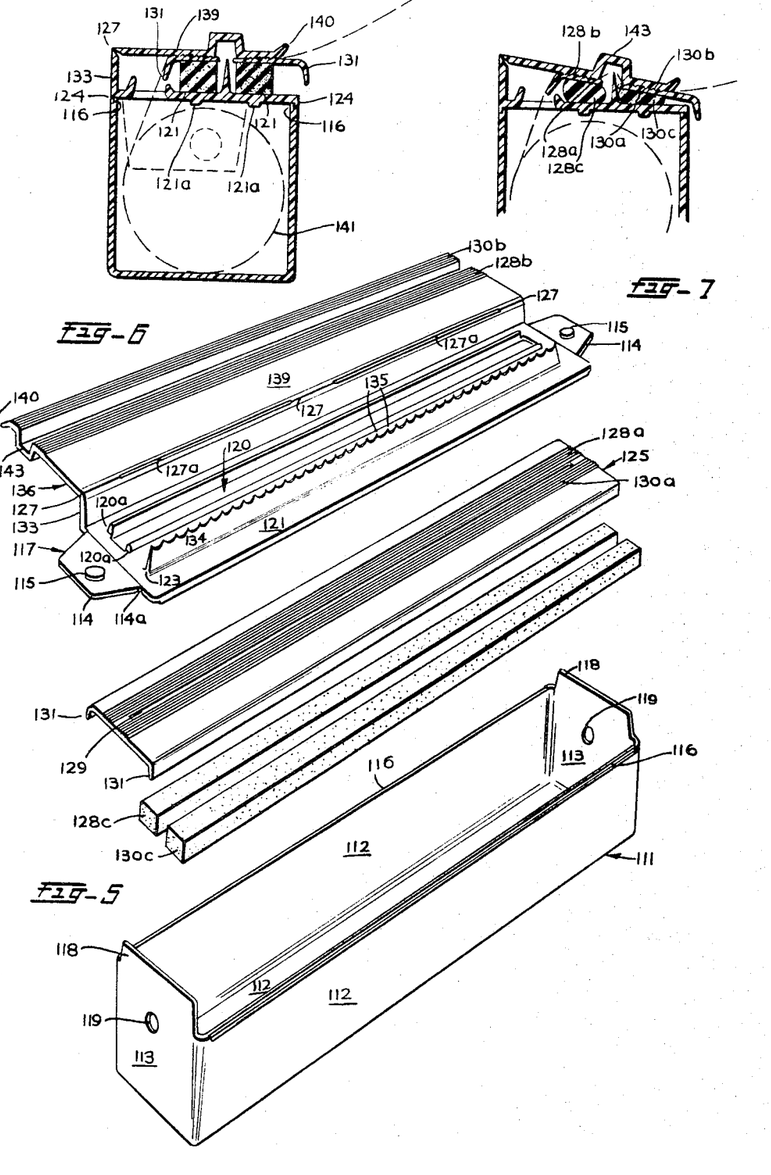
FIGURE 5 is an exploded view of a second embodiment.
FIGURE 6 is a cross-sectional view of assembled FIGURE 5 looking in an axial direction and just prior to actuation of cutter.
FIGURE 7 is a view similar to FIGURE 6 showing the position of the parts just after the cutter has been actuated and the sheet cut.

With reference to FIGURES 5, 6, and 7, a second embodiment of the invention is shown.

The container 111 is provided with three walls 112, two ends 113, a locking aperture 119 in each end, an alignment leg 118 on each end, and two container-mating edges 116.

A cover 117 is provided with a wrap dispensing slot 120 having wrap dispensing slot reinforcing and guiding ridges 120a, two supporting surfaces 121 having supporting surface reinforcing ridges 121a and a blade support 123. The cover 117 is further provided with two projecting arms 114 attached to the cover by integral hinge 114a. Each of the projecting arms 114 contains a locking button 115. The cover further contains two mating edges 124 adapted to mate with complementary container mating edges 116. The cover is removably attached to the container by folding projecting arms 114 downward and inward about integral hinges 114a. The cover is then guided between alignment legs 118 until mating edges 124 rest on container-mating edges 116. In this position locking buttons 115 are free to move outward into locking apertures 119 to hold the cover in place. The integral hinges 114a have a normal bias outward which in effect causes a spring-like movement of locking buttons 115 into place.

Blade 134, having scalloped teeth 135, rests on blade support 123 and is preferably molded in one piece integrally with cover 117.

On each side of blade 134 resilient strips 128c and 130c are adhesively held on supporting surfaces 121. The resilient strips are preferably made of vinyl open-celled foam and are preferably of sufficient height to enable the top edge to be approximately level with or slightly higher than blade 134. The top surface of each resilient strip could be utilized to form a clamping surface. However, in the embodiment shown, it is preferred to have an inner clamp 125 having a serrated clamping surface 128a, a blade receiving slot 129, and a second serrated clamping surface 130a. The inner clamp 25 has each edge terminated in an edge flange 131. The outer edge flange 131 serves to guide the wrap upon exit from the dispenser and cutter and covers the front for a more attractive appearance. The inner edge flange helps to guide the wrap into the clamping area after it leaves the wrap dispensing slot 120. The inner clamp 125 is preferably made from a thin, soft and very flexible plastic material so that it will readily adopt its surface to the mating clamps under the force of resilient strips 128c and 130c to which it is adhesively held.

Mounted to the rear of cover 117 is hinge wall 133 to which is held outer clamp 136 by means of integral hinge 127. Slots 127a are provided in integral hinge 127 so as to make it less stiff. Outer clamp 136 contains an outer cover 139 area and lifting projection 140. It has a hump 143 on each side of which is a serrated clamping surface 128b and 130b. The hump in operating position overlies blade 134 and during the cutting action receives the blade thereinto. Also, the channel-like nature of the hump provides a beam for the top surface and, in conjunction with the beam-like nature of the cutting blade and supporting surface reinforcing ridges 121a, serves to stiffen the device to resist the deforming effect of the cutting forces when they are applied.

It is readily seen from FIGURE 5 that the cover 117, outer clamp 136, projecting arms 114, blade 134, and other related items are all provided in a one-piece plastic molding, preferably made of polypropylene which is especially suitable for integral hinges, such as 114a and 127. A one-piece molding provides a device which is very easily assembled with all the parts automatically falling into proper alignment. The alignment and assembly could be a problem if the items were separately made and then assembled.

The operation of the embodiment shown in FIGURES 5 through 7 is similar to that of the first embodiment. A roll of household aluminum foil wrap is placed in the container and an end roll 141 of the foil is placed in the container and a portion is drawn from the roll and passed through wrap dispensing slot 120 as the cover 117 is removably placed on the container. The end of the foil is then drawn between outer clamp 136 and inner clamp 125. When it is desired to obtain a piece of wrap, the outer clamp is lifted by projection 140 and the end of the wrap is grasped and a desired amount pulled from the container. Then the outer clamp is depressed, gripping the wrap between mating clamping surfaces 128a and 128b on one side of blade 134 and mating clamping surfaces 130a and 130b on the other side of the blade 134. As the cutting force is applied to the outer clamp 136, resilient strips 128c and 130c are caused to compress as shown in FIGURE 7, forcing the mating clamping surfaces tightly towards one another, thereby grasping the wrap and holding it while it is pulled down over blade 134 which completely severs the wrap in an attractive, relatively straight, and jagged square line. Upon release of the cutting force, the compressed resilient strips return the combined dispenser and cutter to the position shown in FIGURE 6 where the clamping force is almost completely absent so that the severed end can be readily withdrawn from the cutting area.

It is to be noted that in this second embodiment, the resilient strips not only serve to force the clamping areas together but also serve as spring-like members to return the dispenser and cutter to its normal position upon release of the cutting forces.

Figure 8:
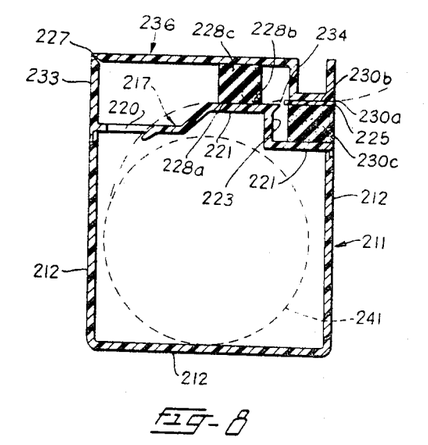
FIGURE 8 is a schematic representation of a cross-sectional view of a third embodiment looking in an axial direction and just prior to actuation of the cutter.
Figure 9:
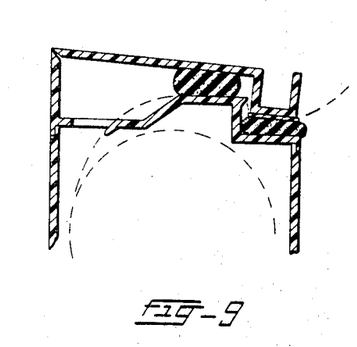
FIGURE 9 is similar to FIGURE 8 but showing the position of the parts just after actuation of the cutter.

With reference to the third embodiment shown schematically in FIGURES 8 and 9, this embodiment is quite similar to that shown in FIGURES 5 through 7. There is provided a container 211 having three side walls 212 and two end walls which are not shown. Removably attached to the container is a cover 217 having a dispensing slot 220 and two supporting surfaces 221 on each side of a blade support 223. Integrally attached to blade support 223 is a blade 234 having a series of teeth which are not shown. At the rear of cover 217 is provided an integral hinge wall 233 containing an integral hinge 227 to which is integrally attached an outer clamp 236. Adhesively fixed to outer clamp 236 is a resilient strip 228c, the surface of which 228b provides one clamping surface which mates with a clamping surface 228a, which may be serrated, which is the surface of one of the supporting surfaces 221. The inner surface of hump 243 may be serrated and forms a clamping surface 230b which mates with a complementary clamping surface 230a, which may also be serrated. Clamping surface 230a is formed on an inner clamp 225 which is a thin flexible piece of soft plastic adhesively adhered to resilient strip 230c. Resilient strip 230c is also adhesively adhered to the front supporting surface 121.

The operation of the third embodiment is similar to that of the second embodiment shown in FIGURES 5 through 7. The outer clamp 236 is raised and the end of the roll 241 is grasped and a desired amount of wrap is extracted. Then the outer clamp 236 is permitted to close and is pressed downwardly against the resistance of resilient strips 228c and 230c. The first portion of the movement clamps the wrap between mating surfaces 228a and 228b on one side of blade 234 and clamps the wrap between mating surfaces 230b and 230a on the opposite side of blade 234. Upon further cutting movement, the wrap is pulled down over blade 234 to preferably cause complete severing of same along a substantially straight and square line. Upon release of the cutting force, the resilient strips which were compressed in the manner shown in FIGURE 9 return the combination dispenser and cutter to its normal position as shown in FIGURE 8 permitting ready withdrawal of the severed portion of the wrap.

Figure 10:
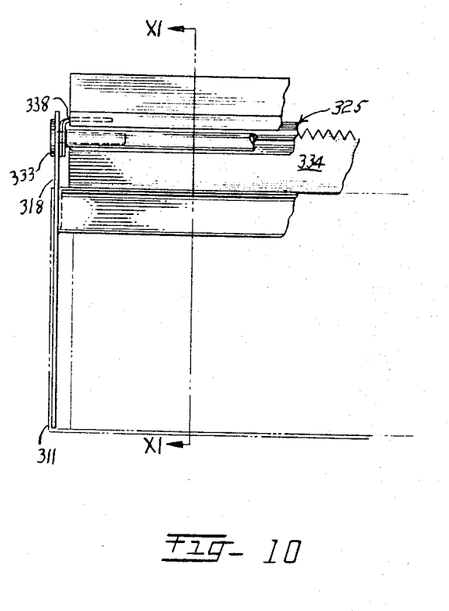
FIGURE 10 is a left rear view of a cutaway portion of a fourth embodiment.
Figure 11:
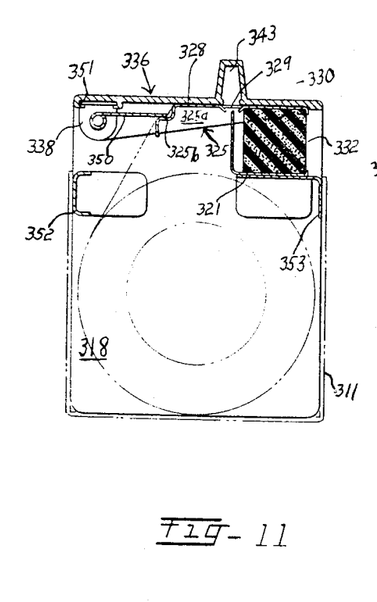
FIGURE 11 is a cross-sectional view taken along lines XI—XI of FIGURE 10.

The fourth embodiment shown in FIGURES 10 and 11 is a departure from the previous three embodiments largely in that its framework is adapted to fit in any of a wide number of containers 311 shown in dotted lines including a cardboard container similar to those in which household wrap is presently sold provided the top is first removed.

Alignment legs 318 at each end of the assembly are rectangular thin metal plates which closely match the end dimensions of the container and have holes drilled therein at their upper rear corners to receive rivets 333 which pass through pivot bearings 338 and holes drilled in end tabs 325a bent downward at each end of inner clamp 325. The rivets are driven into and frictionally held by the tubular portion of retarder 350. Pivot bearings 338 are fitted and securely staked into slot 351 which is extruded in the outer clamp and cover 336. This permits the outer clamp and cover 336, inner clamp 325 and retarder 350 to freely pivot with relative independence to one another. The outer clamp and cover also has extruded therein a blade-receiving channel and hump 343.

The inner clamp 235 which has one side pivoted, has the other side adhesively affixed to a resilient strip of vinyl foam 332 along its outer border and contains adjacent the inner edge of said resilient strip a blade-receiving slot 329 which has adjacent either side thereof clamping areas 328 and 330 which mate with similar clamping areas on the underside of the outer clamp and cover. The inner clamp 325 also contains a retarding ridge 325b which mates with retarder 350 in a manner such that the material being dispensed from the roll as shown in dotted lines passes between the retarder and retarding ridge and is held by the force of gravity on the retarder from falling back into the container after being cut.

The blade 334 is mounted on inner cover and blade support assembly 321 which also supports the resilient strip 332 which is adhesively attached thereto. The supporting assembly is welded at each of its ends to the alignment legs 318 and has a re-enforcing and alignment flange 353 at its front end. Re-enforcing and alignment channel 352 is attached to the rear of the unit by having both of its ends welded to alignment legs 318. The operation of the fourth embodiment is readily apparent by reference to the operation of the previous three embodiments.

It is to be noted that in the case of aluminum foil all three embodiments serve to form a small upward flange on the severed end of the foil due to its being pulled downward over the cutting blade. This permits a ready grasping of the end of the foil when a new piece is to be extracted. Also, it is readily seen that in all three embodiments the clamping action is sufficient to prevent the withdrawal of the sheet either from the remaining roll or from the portion desired to be severed. This prevents the sheet from merely draping itself over the cutting blade rather than being cut and results in the very efficient cutting action which is obtained. Also, it will be readily apparent that although the invention has been described primarily for use as a combination dispenser and cutter, it is obviously also usable with other household wrap, such as wax paper and the like, and is readily adaptable to other sheet materials of widths varying from narrow to wide. Normally, however, the invention is preferably utilized with household wrap dispensed from a roll having a width varying from about 7 inches to about 18 inches and a thickness of less than .006 inch.

While the invention has been particularly shown and described with reference to three preferred embodiments thereof, it will be understood by those skilled in the art that changes in form and details may be made therein without departing from the spirit and scope of the invention.

Figure 12:
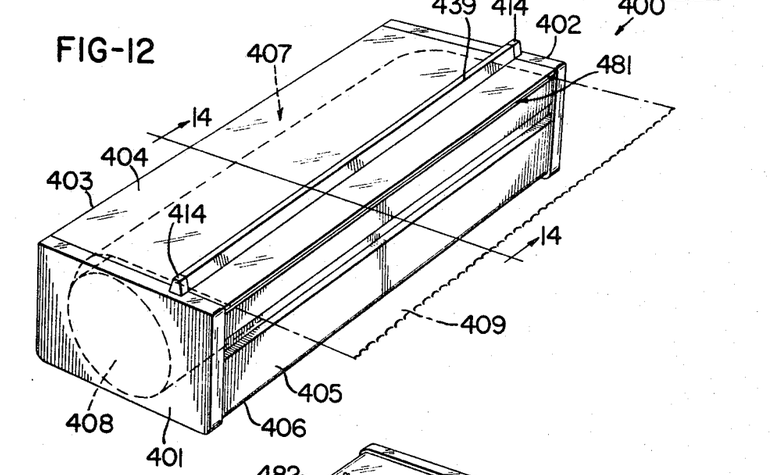

As illustrated in FIGURE 12, another household wrap dispensing container or the like of this invention is generally indicated by the reference numeral 400, the dispensing container 400 being substantially rectangular and defined by six wall means 401, 402, 403, 404, 405 and 406 constructed in a manner hereinafter set forth to define a compartment 407 therein for receiving a supply roll 408 of wrapping material 409.

The opposed end wall means 401 and 402 of the dispensing container 400 can be formed of metal or any other suitable material, such as molded plastic or the like and each is substantially formed in the manner illustrated in FIGURE 19 wherein the end wall member 410 has a recess 411 in the inner side thereof defined by a peripheral wall 412 and an end wall 413 for a purpose hereinafter described, the peripheral wall 412 defining a truncated triangular portion 414 at the top thereof for a purpose hereinafter described. The end wall portion 413 of the end wall member 410 has a plurality of inwardly extending guide pins, 415, 416, 417 and 418, a wrapping material positioning flange 419, an assembly flange 420 and a substantially C-shaped pivot pin 421 for a purpose hereinafter described.

Substantially all of the remaining parts of the dispensing container 400 can be formed of extruded metallic material or plastic material as desired in the manner illustrated in FIGURES 22–27.

Figure 22:
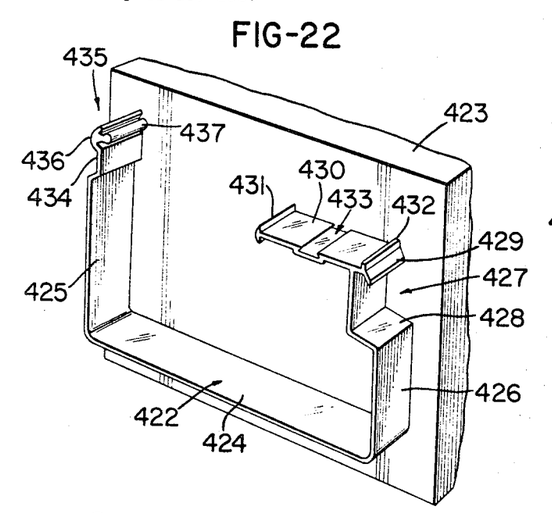
FIGURES 22-27 are respectively schematic views illustrating how various parts of the container of FIGURE 12 can be formed by simple extrusion means.

In particular, it can be seen in FIGURE 22 that a wall member 422 can be extruded from a conventional extruding apparatus 423 wherein a wall portion 424 of the member 422 can form the end wall means 406, a wall part 425 can form the wall means 403 and the wall part 426 can form the wall means 405.

As illustrated in FIGURE 22, the wall part 426 of the extruded member 422 has a recess 427 therein defined by a lower shoulder 428 and an upper flange 429 for a purpose hereinafter described, the upper flange 429 being located at one end of an inwardly directed supporting shelf 430 having upwardly directed flanges 431 and 432 at each end thereof and a dovetailed groove 433 throughout the length thereof. The groove 433 has a substantially truncated triangular cross-sectional configuration.

The wall part 425 of the extruded member 422 of FIGURE 22 has an inwardly offset end 434 provided with a hinge means 435 defined by a substantially C-shaped part 436 integrally joined to an inwardly extending bead 437 for a purpose hereinafter described.

Figure 23:
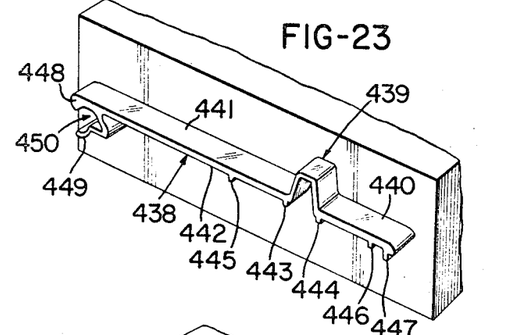

The wall means 404 of the container 400 is adapted to be formed from the extruded member 438 of FIGURE 23, the extruded member 438 having a substantially truncated triangular part 439 integrally interconnected to substantially coplanar opposed parts 440 and 441. The truncated triangular part 439 is substantially identical in cross-sectional configuration to the truncated triangular parts 414 on the end members 410.

The lower surface 442 of the extruded member 438 has a pair of outwardly extending ribs 443 and 444 on each side of the truncated triangular part 439 as well as other downwardly directed ribs 445, 446 and 447 for a purpose hereinafter described.

The left-hand end of the section 441 of the extruded part 438 of FIGURE 23 has an arcuate flange 448 cooperating with a lower arcuate flange 449 to define a substantially circular cross-section recess 450 therebetween to cooperate with the parts 436 and 437 of the extruded member 422 in a manner hereinafter described.

Figure 24:
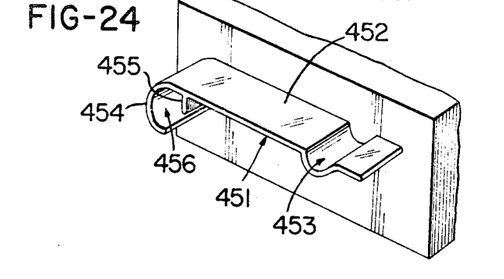

A removable guide member 451 is illustrated in FIGURE 24 and has a substantially flat and straight part 452 interrupted by a groove 453 for cooperating with the rib 445 on the extruded part 438 in a manner hereinafter described, the extruded part 451 having an arcuate flange 454 at the left end thereof cooperable with a downwardly directed straight flange 455 to define a recess 456 therebetween which is adapted to telescopically receive the C-shaped hinge pin means 421 on the end members 410 in a manner hereinafter described.

Figure 25:
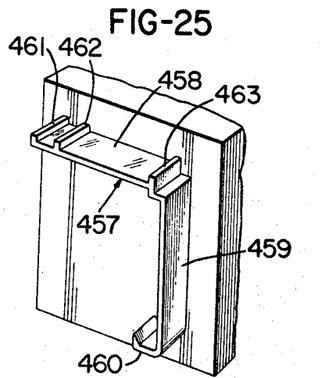

Another extruded member 457 is illustrated in FIGURE 25 and comprises two integrally joined and substantially right-angled legs 458 and 459, the leg 459 being adapted to form part of the wall means 405 of the container 400 in a manner hereinafter described.

The part 459 of the extruded member 57 has a reversely turned end 460 adapted to be received in the recess 427 of the extruded part 422 of FIGURE 22 and cooperates with the shoulder 428 and flange 429 thereof in a manner hereinafter described.

The upper part 458 of the extruded member 457 has a plurality of upwardly directed ribs 461, 462 and 463, the ribs 461 and 462 being adapted to receive the rib 444 of the extruded part 438 therebetween while the rib 463 of the extruded part 457 is adapted to be received between the ribs 446 and 447 of the extruded part 438 for a purpose hereinafter described.

Figure 26:
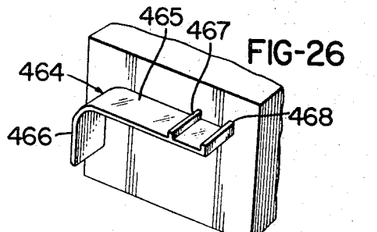

Another extruded part is generally indicated by the reference numeral 464 in FIGURE 26 and is adapted to cooperate with the extruded part 457 of FIGURE 25 in a manner hereinafter described, the extruded part 464 having a substantially flat upper section 465 integrally joined to a downwardly extending flange 466. The flat section 465 of the extruded member 464 has a pair of upwardly directed ribs 467 and 468 adapted to receive the rib 443 of the extruded part 438 therebetween in a manner hereinafter described.

Figure 27:
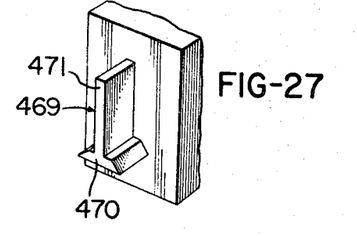

The cutting blade of the dispenser 400 of FIGURE 12 can be formed from an extruded member generally indicated by the reference numeral 469 in FIGURE 27 and comprises a substantially truncated triangular base section 470 medially interconnected to an upstanding substantially rectangular section 471, the base section 470 being so constructed and arranged that the same is adapted to be telescopically received in the groove 433 of the extruded part 422 of FIGURE 22 in a manner hereinafter described. The straight section 471 of the extruded member 469 is adapted to be provided with a plurality of scalloped teeth 472, FIGURES 18 and 19, to form a cutting edge 473 having a forward flat side 474 and a scalloped rear side 475 for a purpose hereinafter described.

Therefore, it can be seen that the various parts of the dispensing container 400 of this invention can be simply and inexpensively formed by simple molding or extrusion operations.

In addition to the parts previously described, the dispensing container 400 includes a pair of resilient members 476 and 477 formed of foamed plastic material or the like and having a natural resiliency to remain in the substantially rectangular cross-sectional configuration illustrated in FIGURE 17 for a purpose hereinafter described.

Figure 19:
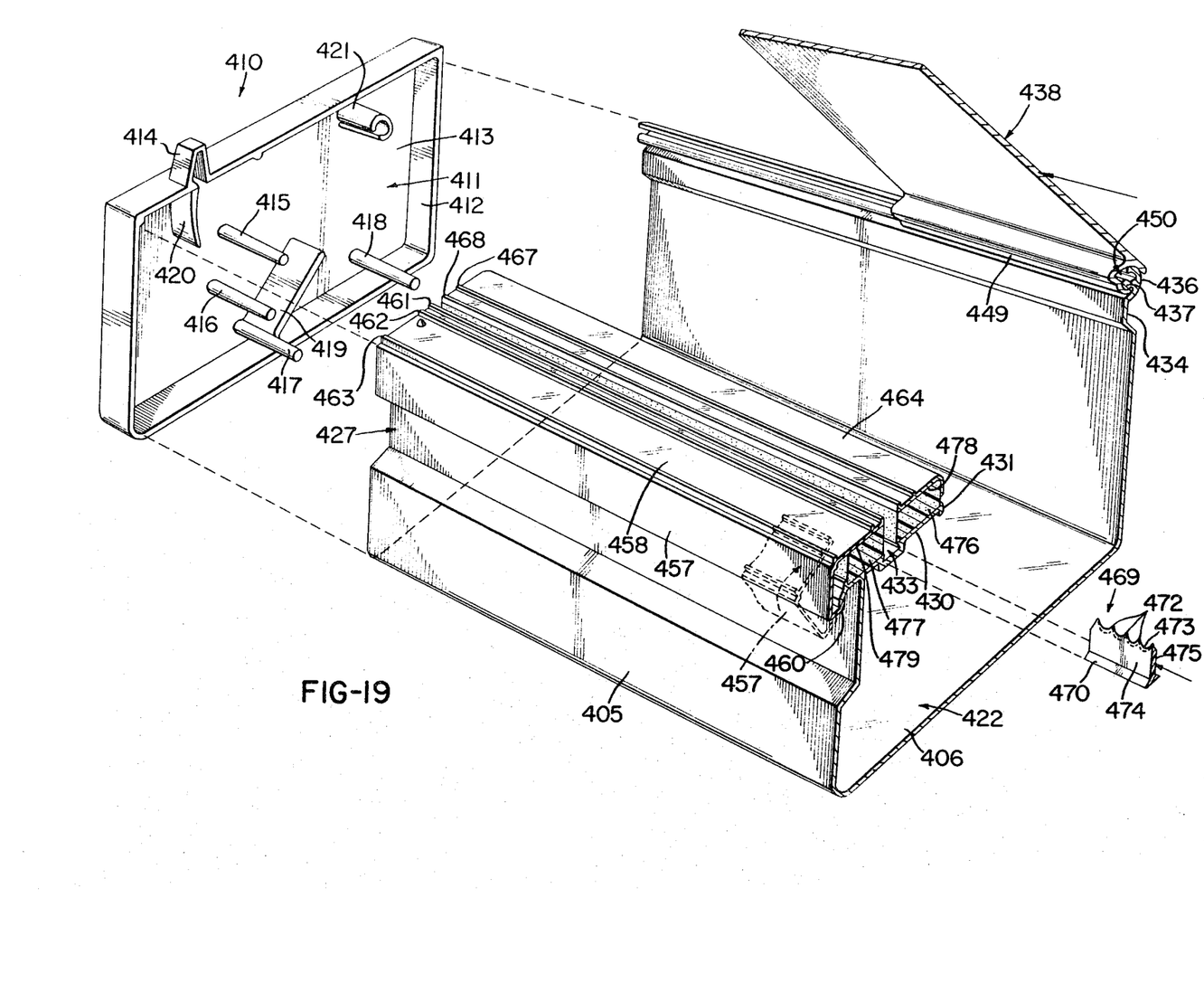
FIGURE 19 is an exploded perspective view illustrating one method for assembling the container of FIGURE 12.

When forming the dispensing container 400, the resilient member 476 and 477 are adapted to be respectively secured on the shelf portion 430 of the extruded part 422 on each side of the groove 433 thereof and inboard of the upstanding flanges 431 and 432 in the manner illustrated in FIGURE 19, the resilient members 476 and 477 being secured to the shelf portion 430 by a suitable adhesive means, such as an epoxy resin or the like.

The extruded part 464 is adapted to have the lower surface 478 thereof secured by a suitable adhesive to the upper surface of the resilient member 476 in the manner illustrated in FIGURE 19.

When the extruded part 457 is assembled to the extruded part 422 in the manner illustrated in FIGURE 19. the lower surface 479 of the leg 458 is secured to the upper surface of the resilient member 477 by a suitable adhesive, if desired.

The cutting blade 469 is adapted to be assembled to the extruded part 422 by axially telescoping the base portion 470 thereof in the dovetailed groove 433 of the shelf portion 430 in the manner illustrated in FIGURE 19, the base section 470 being secured in its final position in the groove 433 by a suitable adhesive.

Figure 17:
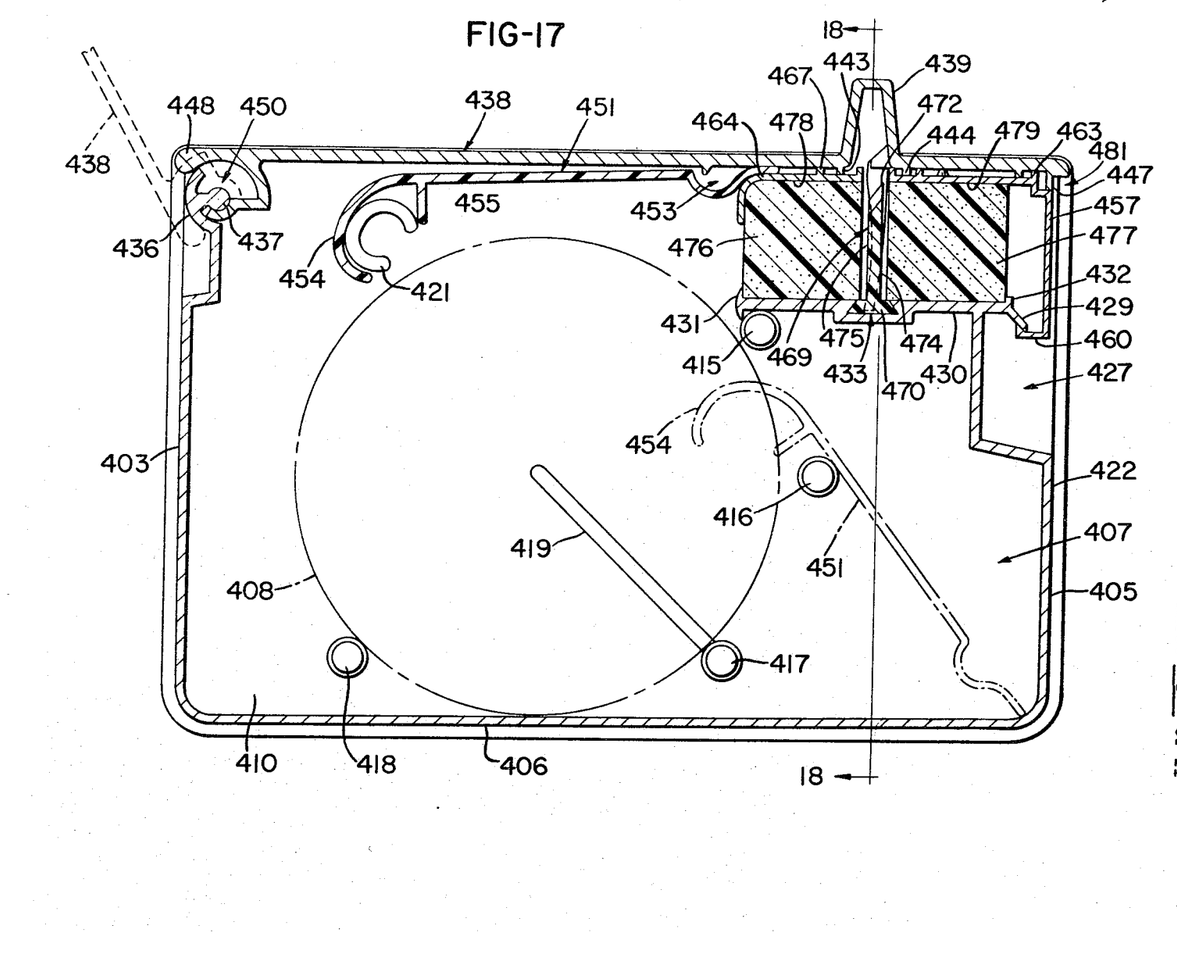
FIGURE 17 is an enlarged view similar to FIGURE 14.

The cover member or part 438 is also adapted to be assembled to the extruded part 422 by axially telescoping the parts 436 and 437 of the member 422 in the recess 450 of the cover member 438 in the manner illustrated in FIGURE 19 whereby the members 438 and 422 are interlocked together in the manner illustrated in FIGURE 17 while permitting pivotal movement therebetween in the manner illustrated by dotted lines in FIGURE 17.

After the parts 422, 438, 457, 464, 469, 476 and 477 have been assembled together in the manner previously described, the end members 410 are telescoped over the same at the ends thereof whereby the flanges 420 of the end members 410 are received in the opposed ends of the groove 433 of the extruded member 422, the pins 415 are received under the shelf portion 430 of the member 422 to support the same and the peripheral flanges 412 of the end members 410 completely encompass the opposed ends of the assembled parts 422, 457 and 464.

The end members 410 are so constructed and arranged that the cover member or outer wall member 438 has its opposed ends adjacent to and substantially coplanar with the cooperating surfaces of the peripheral flanges 412 in a manner hereinafter described so that the cover member 438 is movable relative to the end members 410 even though the opposed ends of the members 422, 457 and 464 are fully received in the recesses 411 of the end members 410.

The end members 410 are adapted to be secured to the opposed ends of the member 422 by suitable epoxy resin or other adhesive means to hold the dispensing container 400 in its assembled condition whereby no fastening members are required to assemble the dispensing container 400 of this invention.

Figure 20:
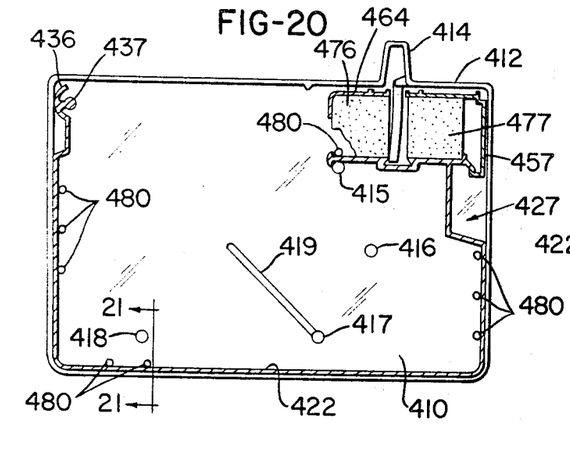
FIGURE 20 is a view similar to FIGURE 14 with various parts thereof removed.
Figure 21:
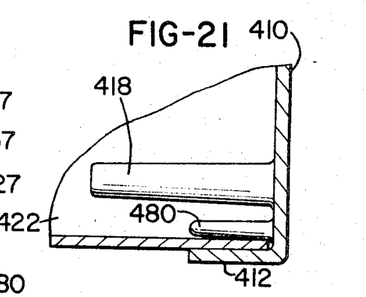
FIGURE 21 is an enlarged, fragmentary view taken on line 21—21 of FIGURE 20.

In addition, inwardly directed pin means 480 can be formed on the end members 410 to provide a press fit relation with the peripheral flanges 412 when the opposed ends of the extruded member 422 is telescopically received therebetween in the manner fully illustrated in FIGURES 20 and 21. In this manner, further rigidity can be provided between the assembled parts of the dispensing container 400 of this invention.

Figure 18:
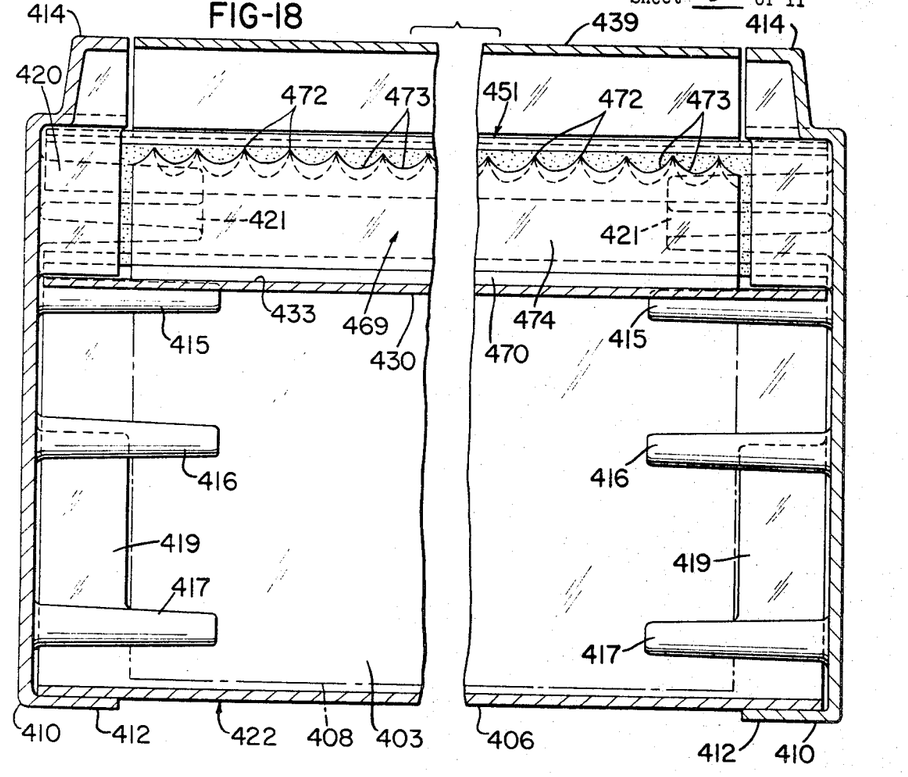
FIGURE 18 is an enlarged, cross-sectional view taken on line 18—18 of FIGURE 17.

In addition, while the blade 469 is illustrated spaced from the flanges 420 of the assembled end members 410 in the manner illustrated in FIGURE 18, the same can be disposed in abutting relationship therewith to prevent axial movement of the blade 469 in the groove 433. Of course, the blade 469 can be firmly fastened in the groove 433 by a suitable adhesive means or the like.

During normal merchandising of the dispensing container 400 of this invention, the guide member 451 for the respective container 400 is normally stored in the compartment 407 thereof in the manner illustrated in dashed lines in FIGURE 17 and is held therein by the forward pins 416 of the end members 410.

However, when the ultimate consumer desires to utilize the dispensing container 400 of this invention, the guide member 451 is removed from its stored condition illustrated in dotted lines in FIGURE 17 before the roll 408 of desired wrapping material 409 is disposed in the compartment 407. If the container 400 is to be utilized on a counter top or the like in the horizontal position illustrated in FIGURE 12, the supply roll 408 of wrapping material 409 is adapted to be disposed in the compartment 407 by merely opening the cover member 438 in the manner illustrated by dotted lines in FIGURE 17 so that the roll 408 can be disposed in the compartment 407 between the roll guide flanges 419 of the end members 410 and rest on the guide pins 417 and 418 in the manner illustrated in FIGURE 17.

Thereafter, the guide member 451 is disposed in the position illustrated in FIGURE 17 by snap fitting the flanges 454 and 455 thereof over the C-shaped hinge means 421 of the end members 410 to pivotally mount the guide member 451 thereto with the forward edge of the guide member 451 resting on top of the member 464.

The free end of the wrapping material 409 is fed from the supply roll 408 over the top of the guide member 451 and out through the dispensing opening 481 of the dispensing container 400, the dispensing opening 481 being defined between the outer wall member 438 and the inner wall means defined by the cooperating members 457 and 464.

Figures 14, 15, 16:
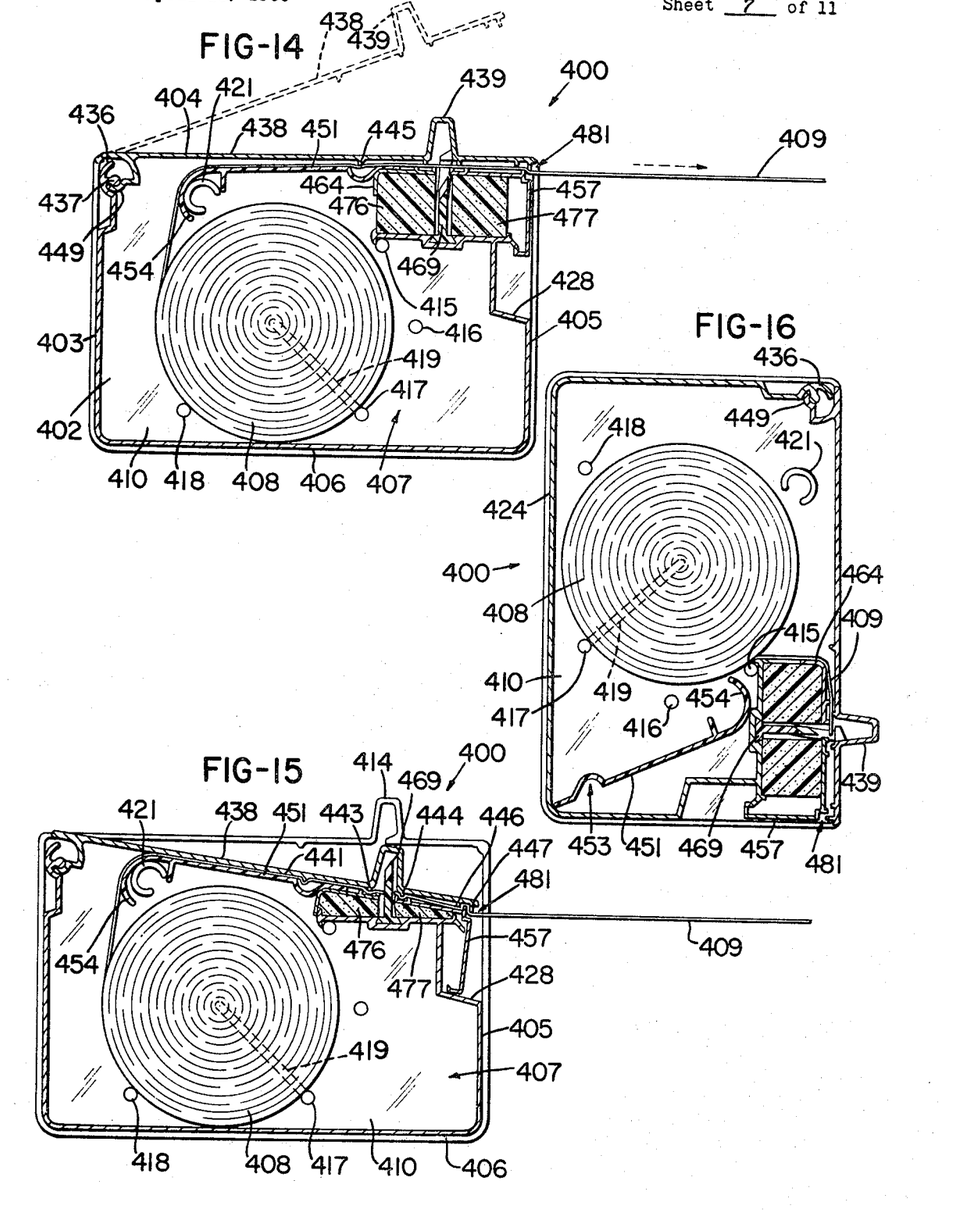
FIGURE 14 is an enlarged, cross-sectional view taken on line 14—14 of FIGURE 12.
FIGURE 15 is a view similar to FIGURE 14 and illustrates the container of FIGURE 14 in its cutting position.
FIGURE 16 is an enlarged, cross-sectional view taken on line 16—16 of FIGURE 13.

Normally, when it is desired to dispense a desired length of wrapping material 409 from the dispensing container 400 of this invention, the cover member 438 is raised by the user substantially to the position illustrated in dotted lines in FIGURE 14 and the free end of the material 409 is drawn outwardly from the supply roll 408 until the desired length thereof has been selected, the user raising the cover member 438 by merely grasping the truncated triangular portion 439 thereof as a handle means.

After the desired length of wrapping material 409 has been dispensed from the container 400, the user returns the cover member 438 to the position illustrated in FIGURE 14 and pushes inwardly on the same to the position in FIGURE 15 whereby it can be seen that the ribs 443 and 444 on the cover member 438 are received between the ribs 467, 468 and 461, 462 of the members 464 and 457 while the rib 463 of the member 457 is received between the ribs 446 and 447 of the cover member 438 to crimp and positively clamp the wrapping material 409 between the outer wall 441 and the parts 464 and 457.

With the wrapping material 409 firmly clamped between the outer wall 438 and the inner wall means 464 and 457 on opposite sides of the cutting blade 469, further inward movement of the outer wall 438 from the position illustrated in FIGURE 14 to the position illustrated in FIGURE 15 causes the clamped wrapping material 409 to be severed by the cutting blade 469 in the manner illustrated in FIGURE 15 and in the manner previously described.

When the user releases the outer wall 438 from its cutting position illustrated in FIGURE 15, the natural resiliency of the resilient means 476 and 477 returns the members 464, 457 and outer wall 438 back to the full line position illustrated in FIGURE 14 whereby the severed and dispensed length of wrapping material 409 can be removed from the dispensing container 400 by pulling outwardly on the same.

The new leading edge of the wrapping material 409 can be subsequently grasped and dispensed out of the container 400 in the manner previously described by merely raising the cover member 438 and grasping the same, the cooperating rib 445 on the cover member 438 and groove 453 on the guide member 451 crimping the wrapping material 409 therebetween to prevent the same from slipping back into the compartment 407 of the dispensing container 400 after a previously described severing operation.

Therefore, it can be seen that the dispensing container 400 of this invention can be readily used for dispensing household wraps or the like in a simple and effective manner to positively and accurately sever desired lengths thereof in a simple manner without the adverse feature of having a cutting edge exposed to the hands of the user as the entire cutting operation of the dispensing container of this invention takes place inside the same. Further, the severing operation of this invention can be accomplished in a simple one hand operation while the supply roll 408 is completely encased in the compartment 407 to maintain a sanitary and wrinkle free condition thereof.

Figures 13, 28, 29:
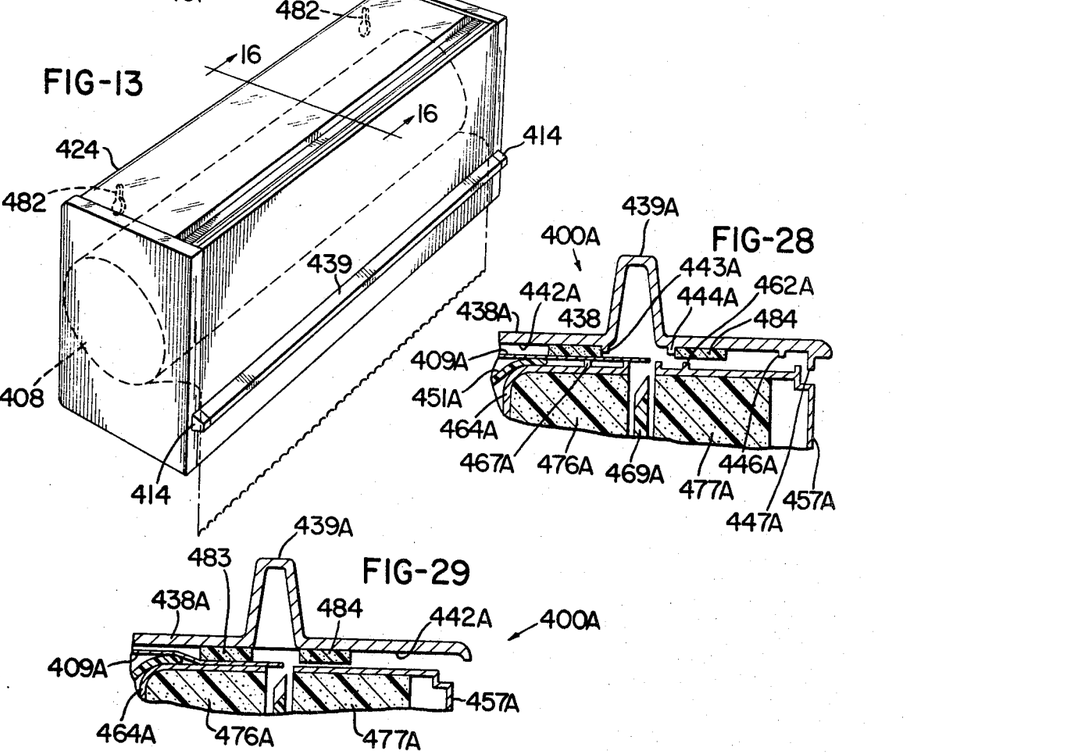

Should it be desired to vertically mount the dispensing container 400 of this invention on a wall or the like, it can be seen that the wall section 424 of the member 422 of the container 400 can be provided with conventional inverted key-hole slots 482 in the manner illustrated in FIGURE 13 for mounting the same to nails or screws protruding from a desired wall.

If desired, the guide member 451 can be removed from the container 400 during the vertical mounting arrangement illustrated in FIGURES 13 and 16 wherein the wrapping material 409 will have the roll 408 thereof now resting on the pin means 415 and 417 of the end members 410 and will be drawn therefrom beneath the same over the member 464 and out through the dispensing opening 481 in the manner previously described.

However, it is to be understood that the guide member 451 and supply roll 408 can be arranged in the manner illustrated in FIGURES 12 and 14 and still be mounted in the vertical position as illustrated in FIGURE 13, if desired.

If desired, the undersurface 42 of the cover member 438 of this invention can be provided with additional resilient clamping means to cooperate with the clamping areas of the inner wall means 464, 457.

For example, reference is now made to FIGURE 28 wherein another embodiment of this invention is generally indicated by the reference numeral 400A and parts thereof similar to the dispensing container 400 previously described are indicated by like reference numerals followed by the reference letter A.

As illustrated in FIGURE 28, the cover member 438A has a pair of resilient strips 483 and 484 secured to the undersurface 442A outboard of the ribs 443A and 444A thereof to cooperate with the ribs 467A and 461A of the members 464A and 457A during the clamping and cutting operation previously described.

While the resilient strips 483 and 484 can be formed in any suitable manner and of any suitable material the embodiment thereof illustrated in the drawings is formed from a vinyl foam tape sold under the designation 4116 by the Minnesota Mining and Manufacturing Company and are approximately ¼ of an inch wide and ¹⁄₁₆ of an inch thick, the strips 483 and 484 being secured to the cover member 438A by a pressure sensitive adhesive being carried by the strips 483 and 484.

If desired, the cover member 438A of FIGURE 28 can be further modified in the manner illustrated in FIGURE 29 wherein not only are the ribs 443A and 444A eliminated but also the forward ribs 446A and 447A are removed so that the under surface 442A of the cover member 43A of FIGURE 29 is substantially straight and the clamping area thereof is provided solely by the resilient strips 483 and 484 thereof.

Therefore, it can be seen that the dispensing containers 400 and 400A of this invention not only combine the improved cutting features previously set forth, but also the dispensing containers 400 and 400A of this invention are so constructed and arranged that the same permit rapid and economical assembly thereof from a relatively few parts without auxiliary fastening means or members while permitting the supply roll of wrapping material to be readily disposed therein by merely opening the cover member thereof, the cover member also serving the dual function of being the actuator for the subsequent cutting operations of the dispenser.

Further, the dispensing containers of this invention readily permit the supply roll of wrapping material to be stored therein in a completely encased condition not only for sanitary purposes but also to maintain the same wrinkle free and in an attractive manner.

In addition, the severing operation of this invention is so constructed and arranged that the dispensing opening of the dispensing containers of this invention move during the cutting operation so that the trailing portion of the dispensed length of wrapping material being severed therefrom remains substantially straight and uncreased.

While the form of the invention now preferred has been disclosed as required by statute, other forms may be used, all coming within the scope of the claimed subject matter which follows.

What is claimed is:

1. A substantially rectangular household wrap dispensing container or the like for serially dispensing selected lengths of wrapping material or the like comprising six wall means defining a closed compartment therein receiving a supply of said wrapping material, said wall means defining a container opening and closing outer wall pivotally mounted to said container and a lower outer wall means movable relative to said container both of which are oppositely paired to define part of an external dispensing opening, said outer wall defining one of said six wall means, said outer wall being moved to a cutting position in unison with said lower wall and said opening to cause cutting of the trailing portion of a selected length of said wrapping material dispensed out of said opening from the remainder of said supply in said compartment, said cutting operation taking place inboard of said external opening and solely by the pivotal movement of said outer wall to its cutting position, said outer wall, thereafter, being pivotally movable to a non-cutting position to permit subsequent dispensing of another selected length of said wrapping material out of said opening, said outer wall being pivotally movable to an open position thereof to provide access means to said compartment for disposing and removing said supply in and from said compartment, said container further including a stationary cutter carried by said container, cooperating clamping surfaces on said outer wall and lower wall means disposed on opposed sides of said cutter for clamping and moving said trailing portion of said material relative to said cutter to cut said trailing portion from the remainder of said supply when said outer wall and said lower wall means are moved to said cutting position, said lower wall means is formed of two separate strips on opposed sides of said cutter, each strip being movable independently of the other strip.

2. A dispensing container as set forth in claim 1 and including two separate resilient means respectively disposed beneath said strips to independently urge said strips to said dispensing positions thereof.

3. A dispensing container as set forth in claim 1 wherein said container further includes a removable guide member forming a rear extension of said lower wall means under said outer wall with one end thereof pivotally mounted to said wall means and the other end thereof engaging and movable with said lower wall means.

4. A dispensing container as set forth in claim 1 wherein said lower wall means has a front surface forming part of one said wall means adjacent said outer wall which includes a flange cooperable with a stationary flange on said one wall means to limit outward movement of said lower wall means relative to said container.

References Cited

UNITED STATES PATENTS

| 833,470 | 10/1906 | Lipowsky | 83—570 |
| 2,823,969 | 2/1958 | Traver et al. | 83—614 X |
| 3,311,278 | 3/1967 | Brandon | 83—649 |

FOREIGN PATENTS

| 67,660 | 6/1940 | Czechoslovakia. |

JAMES M. MEISTER, *Primary Examiner.*

U.S. Cl. X.R.

83—569, 649